No. 693,402. Patented Feb. 18, 1902.
J. E. JOHNSON.
TAKE-UP DEVICE FOR CRANK PIN CONNECTIONS.
(Application filed Dec. 16, 1901.)
(No Model.)
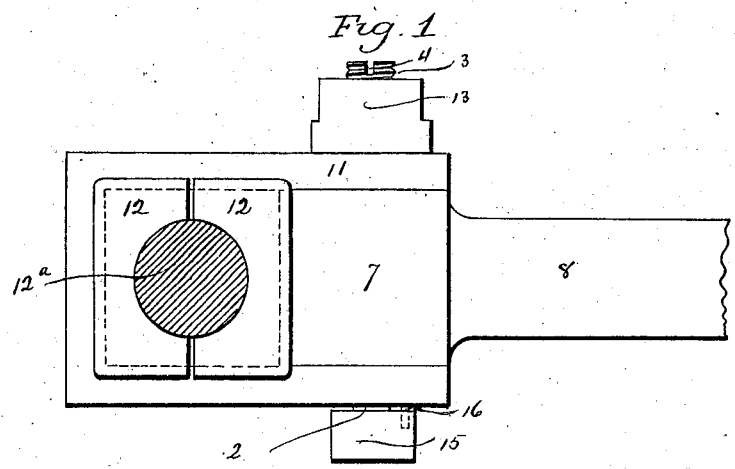
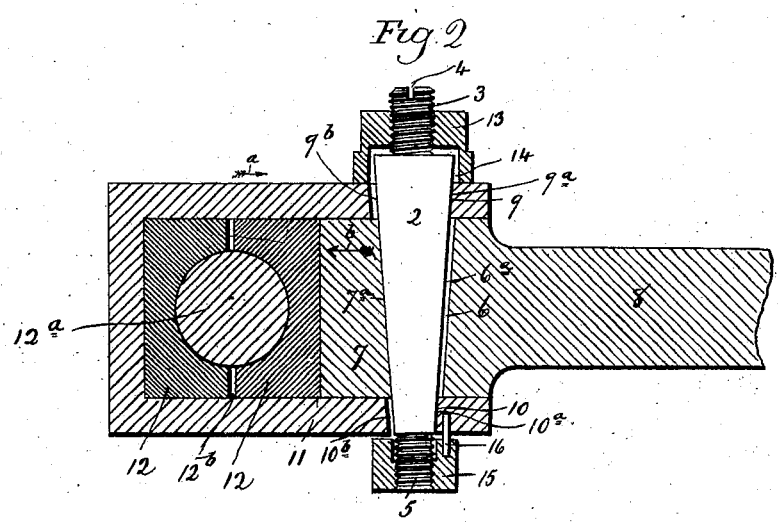

UNITED STATES PATENT OFFICE.

JOSEPH E. JOHNSON, OF MERIDEN, CONNECTICUT.

TAKE-UP DEVICE FOR CRANK-PIN CONNECTIONS.

SPECIFICATION forming part of Letters Patent No. 693,402, dated February 18, 1902.

Application filed December 16, 1901. Serial No. 86,078. (No model.)

*To all whom it may concern:*

Be it known that I, JOSEPH E. JOHNSON, of Meriden, in the county of New Haven and State of Connecticut, have invented a new and useful Improvement in Take-Up Devices for Crank-Pin Connections; and I do hereby declare the following, when taken in connection with the accompanying drawings and the numerals of reference marked thereon, to be a full, clear, and exact description of the same, and which said drawings constitute part of this specification, and represent, in—

Figure 1, a view in side elevation of a device constructed in accordance with my invention; Fig. 2, a view thereof in vertical section.

My invention relates to an improvement in take-up devices for crank-pin connections, the object being to provide simple, durable, and effective means for taking up the wear of crank-pins.

With these ends in view my invention consists in a take-up device for crank-pin connections having certain details of construction and combinations of parts, as will be hereinafter described, and pointed out in the claim.

In carrying out my invention I employ a tapering take-up pin 2, provided at its larger end with a threaded stem 3, having a transverse screw-driver notch 4, and formed at its smaller end with a threaded stem 5. The said pin is passed through a tapering hole 6, formed in the head 7 of the connecting-rod 8, and through tapering openings 9 and 10, differentiated in diameter to correspond to the larger and smaller ends of the pin and formed in the respective ends of a strap 11, which confines the two-part box 12 of the crank-pin $12^a$. The inner member of the said two-part box 12 is maintained in engagement with the outer end of the head 7 of the connecting-rod by means of the said strap 11, which is constantly drawn inward by the engagement of the ends of the take-up pin 2 with the inner walls of the openings 9 and 10 along the lines $9^a$ and $10^a$, and therefore at points opposite the engagement along the line $7^a$ of the outer surface of the said take-up pin with the outer wall of the tapering hole 6 in the head 7, the inner face of the pin being held away from the inner wall of the said hole, so as to produce a take-up space $6^a$. Corresponding take-up spaces $9^b$ and $10^b$ are also produced between the outer face of the pin and the outer walls of the openings 9 and 10 in the strap 11. In the drawings the take-up pin is shown in the position which it will have before any wear has occurred. Therefore the spaces $6^a$ and $9^b$ and $10^b$ represent the maximum take-up of the device. The space $12^b$ between the two parts of the box 12 also represents the maximum take-up of the device. The larger end of the pin 2 is furnished with a check-nut 13, screwed down over the threaded stem 3 of the pin until brought to a bearing upon the strap 11, this nut being formed with a chamber 14 for the reception of the larger end of the pin. The smaller end of the pin is provided with a take-up nut 15, applied to the threaded stem 5 of the pin and held against rotation by a stop-pin 16 entering the strap 11.

When it is desired to take up any wear that may have occurred in the parts of the two-part box 12 and in the crank-pin $12^a$, the check-nut 13 is reversed or unscrewed and the take-up pin 2 turned inward by the application of a screw-driver to the slot 4 in its threaded stem 3, whereby the take-up pin is turned into the stationary take-up nut 15, with the result of moving the pin 2 longitudinally and forcing new portions of its periphery into engagement with the walls of the openings 9 and 10 at the points $9^a$ and $10^a$, whereby the strap 11 is drawn inward in the direction of the arrow $a$ and the two parts of the box 12 drawn together upon the crank-pin $12^a$ until the wear has been taken up. At the conclusion of the operation the take-up spaces $6^a$, $9^b$, $10^b$, and $12^a$ will have been reduced in size and to the same extent. When the take-up capacity of the take-up pin has been exhausted, all of the said spaces will have disappeared, and the pin will fit the holes $6^a$, 9, and 10. The thrust of the pin is exerted in the direction of the arrow $b$.

It will be understood from the foregoing that my improved device provides ample means for taking up wear between a crank-pin and its box and that those means are of a simple, durable, and easily-operated character.

I would have it understood that I do not limit myself to the exact details of construction herein shown and described, but hold myself at liberty to make such changes and alterations as fairly fall within the spirit and scope of my invention.

Having fully described my invention, what I claim as new, and desire to secure by Letters Patent, is—

The combination with a tapering take-up pin provided at its respective ends with threaded stems, of a connecting-rod formed with a tapering hole for the reception of the said take-up pin, a crank-pin, a two-part box therefor, a strap inclosing the said box and having its ends formed with tapered openings which receive the respective ends of the take-up pin which bears upon their walls at points opposite its bearing upon the walls of the said hole formed in the head of the connecting-rod, a check-nut applied to the stem at the larger end of the take-up pin, and a take-up nut applied to the threaded stem at the smaller end of the take-up pin, and held against rotation, substantially as set forth.

In testimony whereof I have signed this specification in the presence of two subscribing witnesses.

JOSEPH E. JOHNSON.

Witnesses:
FREDERIC C. EARLE,
C. L. WEED.